(12) United States Patent  
Zhao et al.

(10) Patent No.: US 9,521,645 B1  
(45) Date of Patent: Dec. 13, 2016

(54) METHOD AND APPARATUS FOR FILTERING ACCESS POINTS FOR WIFI POSITIONING

(71) Applicant: MARVELL INTERNATIONAL LTD., Hamilton (BM)

(72) Inventors: Xing Zhao, Santa Clara, CA (US); Thandapani Venkataramani, Fremont, CA (US); Jing Yu, Pudong District (CN); Zhike Jia, Fremont, CA (US)

(73) Assignee: MARVELL INTERNATIONAL LTD. (BM)

( * ) Notice: Subject to any disclaimer, the term of this patent is extended or adjusted under 35 U.S.C. 154(b) by 229 days.

(21) Appl. No.: 14/291,479

(22) Filed: May 30, 2014

Related U.S. Application Data

(60) Provisional application No. 61/829,428, filed on May 31, 2013.

(51) Int. Cl.
*H04W 24/00* (2009.01)
*H04W 64/00* (2009.01)

(52) U.S. Cl.
CPC .................................. *H04W 64/00* (2013.01)

(58) Field of Classification Search
USPC ......................................................... 370/338
See application file for complete search history.

(56) References Cited

U.S. PATENT DOCUMENTS

| | | | |
|---|---|---|---|
| 8,571,578 B1 * | 10/2013 | Chen ..................... | G01S 5/0009 455/456.1 |
| 2011/0012784 A1 * | 1/2011 | Alizadeh-Shabdiz .. | G01S 19/46 342/357.28 |
| 2014/0036701 A1 * | 2/2014 | Gao ...................... | H04W 48/20 370/252 |
| 2015/0351017 A1 * | 12/2015 | Wirola .................... | H04W 4/02 370/338 |

* cited by examiner

*Primary Examiner* — Edan Orgad
*Assistant Examiner* — Sithu Ko (57) ABSTRACT

Systems, methods, and other embodiments associated with determining a position of a device are described. According to one embodiment, a method for determining a position of a device is disclosed. The method includes detecting access points and classifying one or more of the access points as being either fixed or mobile. An access point classified as being mobile indicates that the access point is mobile. An access point classified as being fixed indicates that the access point is located at a fixed position. The method also includes determining a position of the device based, at least in part, on one or more channel powers of signals respectively received from one or more access points classified as being fixed. In this manner, the position of the device is not determined based on channel powers of signals received from access points classified as being mobile.

15 Claims, 5 Drawing Sheets

METHOD AND APPARATUS FOR FILTERING ACCESS POINTS FOR WIFI POSITIONING

CROSS REFERENCE TO RELATED APPLICATIONS

This patent disclosure claims the benefit of U.S. Provisional Application Ser. No. 61/829,428 filed on May 31, 2013, which is hereby wholly incorporated by reference.

BACKGROUND

Recent technological achievements have made it feasible to deliver indoor positioning for mobile devices. Due to the difficulties in receiving satellite and cellular signals inside a building, indoor positioning applications typically rely on known positions of devices used to establish a wireless network within the building. For example, indoor positioning of a mobile device based on a wireless fidelity (WiFi) network can be performed by determining the mobile device's position relative to known positions of one or more access points of the WiFi network.

SUMMARY

In general, in one aspect this specification discloses a device that includes wireless fidelity (WiFi) positioning logic and monitoring logic. The WiFi positioning logic is configured to receive respective positions of a plurality of access points. The monitoring logic is configured to classify each access point of the plurality of access points as being mobile or fixed. An access point classified as being mobile indicates that the access point is mobile. An access point classified as being fixed indicates that the access point is located at a fixed position. The WiFi positioning logic is further configured to determine a position of the device based, at least in part, on i) one or more channel powers of signals respectively received from one or more access points classified as being fixed by the monitoring logic and ii) respective fixed positions of the access points classified as being fixed by the monitoring logic. In this manner, the position of the device is not determined by the WiFi positioning logic based on channel powers of signals respectively received from access points classified as being mobile by the monitoring logic.

In general, in another aspect, this specification discloses a method for determining a position of a device. The method includes detecting access points and classifying one or more of the access points as being either fixed or mobile. The method also includes determining a position of a device based, at least in part, on one or more channel powers of signals respectively received from one or more access points classified as being fixed. In this manner, the position of the device is not determined based on channel powers of signals received from access points classified as being mobile.

In general, in another aspect, this specification discloses a device. The device includes a wireless transceiver and an application processor. The application processor includes wireless fidelity (WiFi) positioning logic configured to receive respective positions of a plurality of access points and monitoring logic configured to classify each access point of the plurality of access points as being mobile or fixed. The WiFi positioning logic is further configured to determine a position of the device based, at least in part, on i) one or more channel powers of signals respectively received from one or more access points classified as being fixed by the monitoring logic and ii) respective fixed positions of the access points classified as being fixed by the monitoring logic. In this manner, the position of the device is not determined by the WiFi positioning logic based on channel powers of signals respectively received from access points classified as being mobile by the monitoring logic.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1A:
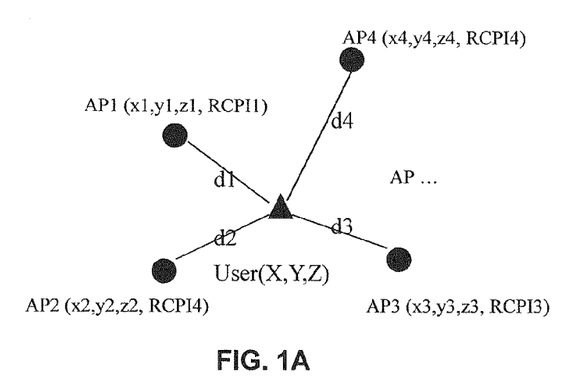
FIG. 1A illustrates an example of wireless fidelity (WiFi) positioning.

Accurate WiFi positioning relies on accurate information about the position of one or more access points used to establish a WiFi network. Referring to FIG. 1A, a first device, (e.g., a user's device) is shown at position (X,Y,Z). Four access points (AP) are within communication range of the user: AP1, AP2, AP3, and AP4. A position (or location) for each AP is recorded. For example, the recorded position for AP1 is (x1, y1, z1) and so on. The user's device is capable of determining a received channel power indicator (RCPI) for a signal received from an AP. The user's device uses the RCPI to select an AP for use in communication with the network and to establish a link with the AP.

The RCPI can also be used to determine a distance between the user's device and the AP. RCPI is expressed as a function of distance d as follows:

$$\text{RCPI} = -(10 \cdot n \cdot \log_{10} d + A) \qquad \text{EQ 1}$$

where A is a known or derived signal strength constant and n is a known or derived signal propagation constant. Given the RCPI, a WiFi positioning application on the user's device (or, in some embodiments, on a server side) can solve Equation 1 to determine the distance between the user's device and the AP. In one embodiment, once the respective distances between the user's device and at least three APs having recorded positions are known, a three dimensional position of the user's device can be determined by the WiFi positioning application. Positioning applications use different methods for determining the position of a device. Equation 2 is used in a trilateration method for determining the position of a device. The trilateration method uses Least Squares to solve a set of equations where each equation expresses the difference in position between the device having a position (X, Y, Z) and an APi having a position (Xi, Yi, Zi).

$$\sqrt{(X-X_i)^2+(Y-Y_i)^2+(Z-Z_i)^2} = di + vi \quad \text{EQ 2}$$

where di is the model-based distance and vi is the measurement noise.

A weighted average method is based on the relative strengths of the channels and uses Equation 3 to determine the position of the device (X, Y, Z).

$$(X, Y, Z) = \frac{\sum_{j=1}^{n} \omega j \cdot (xj, yj, zj)}{\sum_{j=1}^{n} \omega j} \quad \text{EQ3}$$

where j is the number of APs and wj are the weights, which are proportional to the RCPI of the different APs. The weights wj are dynamically allocated depending on the distance between the AP and the device. When the number of APs is greater than 4, the trilateration method is typically preferred. Otherwise, the weighted average method is used.

WiFi positioning applications rely on the positions of APs. Many WiFi positioning applications retrieve positions of APs in a network from an AP location database. The position of an AP that is recorded in the database may be determined by crowd sourcing position data for the AP as determined by other wireless devices in the network. Other methods of determining, recording, and communicating the positions of APs may also be used. If an AP has moved since the last time the position data for the AP was updated, an incorrect position will be recorded for the AP.

Figure 1B:
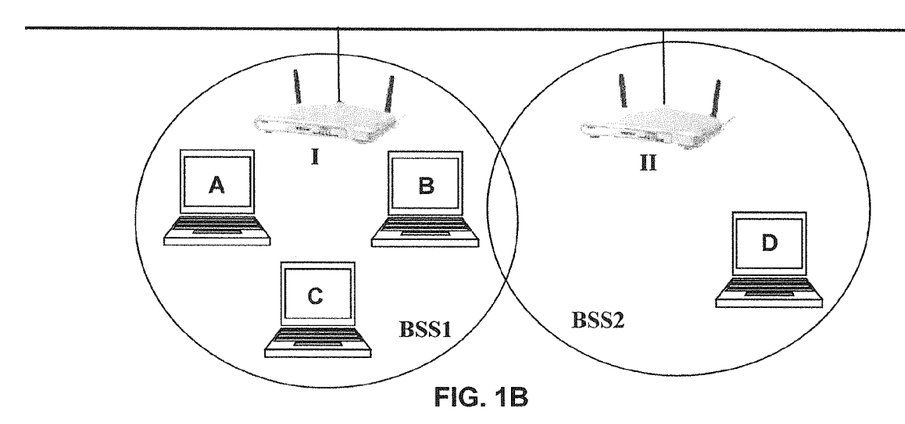
FIG. 1B illustrates a wireless network including a plurality of access points at fixed locations.

In the past, the majority of access points were placed at fixed positions (or location) as part of the infrastructure of a building. For the remainder of this description, the phrase "fixed AP" refers to an access point that is configured to be installed at a fixed location in contrast to a mobile device that is adapted for mobility. FIG. 1B illustrates a WiFI network using an infrastructure mode for Internet connection. Infrastructure mode uses one or more Basic Service Sets (BSS) forming a subnet. FIG. 1A shows two subnets, a first subnet BSS1 associated with a fixed access point (e.g., router) I and a second subnet BSS2 associated with a fixed access point II. BSS1 has three wireless stations A, B, C that communicate with the Internet by way of the fixed access point I. BSS2 has one wireless station D that communicates with the Internet by way of the fixed access point II. Because the position of access points associated with infrastructure mode do not change, WiFi positioning can be performed with accurate results.

Figure 1C:
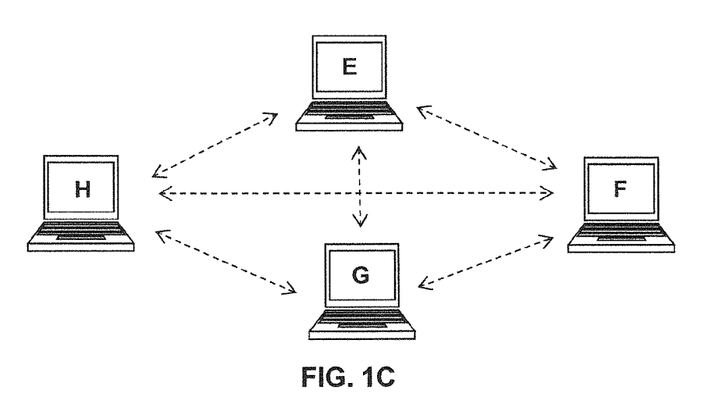
FIG. 1C illustrates a wireless network including a plurality of mobile access points.

As wireless technology evolves, access points are more frequently mobile in nature. Phones, tables, computers, and even vehicles are equipped to communicate directly with other network devices without communicating through a fixed access point. In this "ad-hoc" mode of Internet connection, the devices themselves can be access points for other devices in the network. FIG. 1C illustrates an ad-hoc mode of Internet connection. In ad-hoc mode, Independent Basic Service Sets (IBSS) are used. 802.11 wireless stations E-H can communicate directly with one another without using a fixed access point. In ad-hoc mode, the wireless stations can be constantly moving and as such the access points are mobile rather than fixed making these mobile access points unsuitable for use in WiFi positioning. For the remainder of this description, the phrase "mobile AP" refers to an access point that is adapted for mobility and is expected to move in contrast to fixed access points that are configured to be installed at a fixed location.

WiFi positioning that is performed based on an access point position that is incorrect (e.g., a prior location of a cell phone that has moved) will produce a wrong position for the device. Described herein are examples of systems, methods, and other embodiments associated with identifying and filtering out mobile APs so that WiFi positioning is performed using positions of APs that have been classified as fixed rather than mobile.

Figure 2:
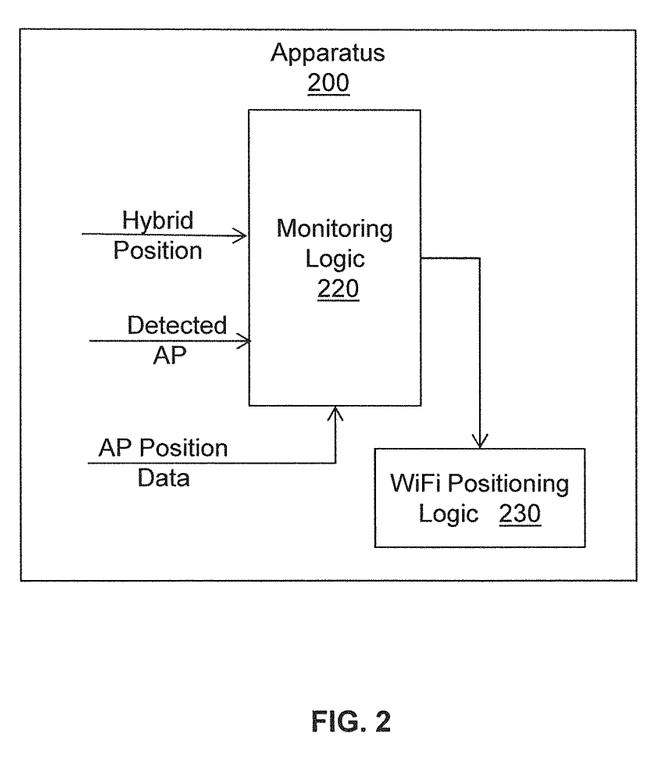
FIG. 2 illustrates one embodiment of an apparatus for performing WiFi positioning based on a filtered set of access points.

With reference to FIG. 2, one embodiment of an apparatus 200 is shown that performs WiFi positioning by filtering out mobile APs to provide more accurate positioning results. The apparatus 200 may be implemented in a network communication device that includes a wireless transceiver and an application processor that provides indoor positioning (see FIG. 4). The apparatus 200 includes a monitoring logic 220 and a WiFi positioning logic 230. The WiFi positioning logic 230 determines a position of the apparatus as described above with reference to FIG. 1A based on the RCPIs of selected APs as filtered by the monitoring logic 220. The monitoring logic 220 filters out APs that the monitoring logic 220 determines to be mobile so that the WiFi positioning logic 230 determines position based only on APs that have been classified as fixed, rather than mobile, by the monitoring logic. In this manner, the WiFi positioning logic 230 is less likely to incorrectly determine a position of the apparatus based on an AP that has moved from its recorded position.

The monitoring logic 220 inputs an identifier for a detected AP (e.g., a MAC address), AP position data for the detected AP, and a hybrid position of the apparatus. The AP position data can be stored either locally on the apparatus or in a server-side database as will be discussed in more detail with reference to FIG. 4. There are at least two ways that the monitoring logic 220 can classify an AP as mobile or fixed: by reference to a prior classification of the AP or by determining a classification of the AP. The AP position data may include a field that labels an AP as either fixed or mobile. The label reflects a prior classification of the AP by either the monitoring logic 220 or a server-side decision logic (see FIG. 4). When the AP position data indicates a prior classification of the AP as mobile, the monitoring logic 220 classifies the AP as mobile.

If the AP has not been classified as fixed or mobile, the monitoring logic 220 classifies the AP as either fixed or mobile based on the hybrid position of the apparatus and a recorded position of the AP provided by the AP position data. A "hybrid" position of an apparatus usually refers to a fusion of positions of the apparatus obtained by more than one means. For example, a hybrid position may be determined based on a combination of data from microelectromechanical system sensors on the apparatus, measurements from a global navigation satellite system (GNSS), a received signal strength indicator (RSSI) from an identified cellular transceiver, or an RCPI from one or more WLAN transceivers as identified by their media access control (MAC) address.

The term "hybrid position" as used herein is meant to encompass a position of the apparatus determined by any means that does not rely on a distance between the apparatus and the AP currently being classified by the monitoring logic 220. Thus, the hybrid position of the apparatus may have been determined based on RCPIs for APs already classified as fixed by the monitoring logic 220. As used herein, the hybrid position is essentially the best available position of the apparatus without reliance on data about the AP that is being classified.

To classify an AP as fixed or mobile, the monitoring logic 220 compares the hybrid position of the apparatus to a recorded position of the AP. If the three dimensional difference between the hybrid position of the apparatus and the recorded position of the AP exceeds a threshold, meaning that the AP's recorded position is outside the WiFi communication range of the apparatus, the AP is classified as mobile by the monitoring logic 220. The classification of mobile in this situation reflects an assumption that the AP must be mobile if the AP's last known position (i.e., the recorded position) was outside the apparatus's communication range and at present the AP is within the apparatus's communication range. The WiFi positioning logic 230 will not include any APs classified as mobile in WiFi positioning calculations. Once the monitoring logic 220 has classified an AP, the classification may be stored in the AP position data for the AP for use in future WiFi positioning.

In one embodiment, the threshold used in the mobile/fixed classification is based on a statistical distribution of the positioning error. For example, a normalized positioning error E as described in Equation 4 can be compared to a threshold for E.

$$\varepsilon = \frac{\sqrt{(x_{ap} - x_u)^2 + (y_{ap} - y_u)^2 + (z_{ap} - z_u)^2}}{\sigma} \quad \text{EQ 4}$$

where $(x_{ap}, y_{ap}, z_{ap})$ is the AP's stored position, $(x_u, y_u, z_u)$ is the user's hybrid position, and $\sigma$ is the hybrid positioning error derived from the covariance matrix of a Kalman filter used in the hybrid fusion algorithm that yields the hybrid position. A Gaussian distribution or Chi-square distribution can be used for statistical fault detection given a certain confidence level.

Figure 3:
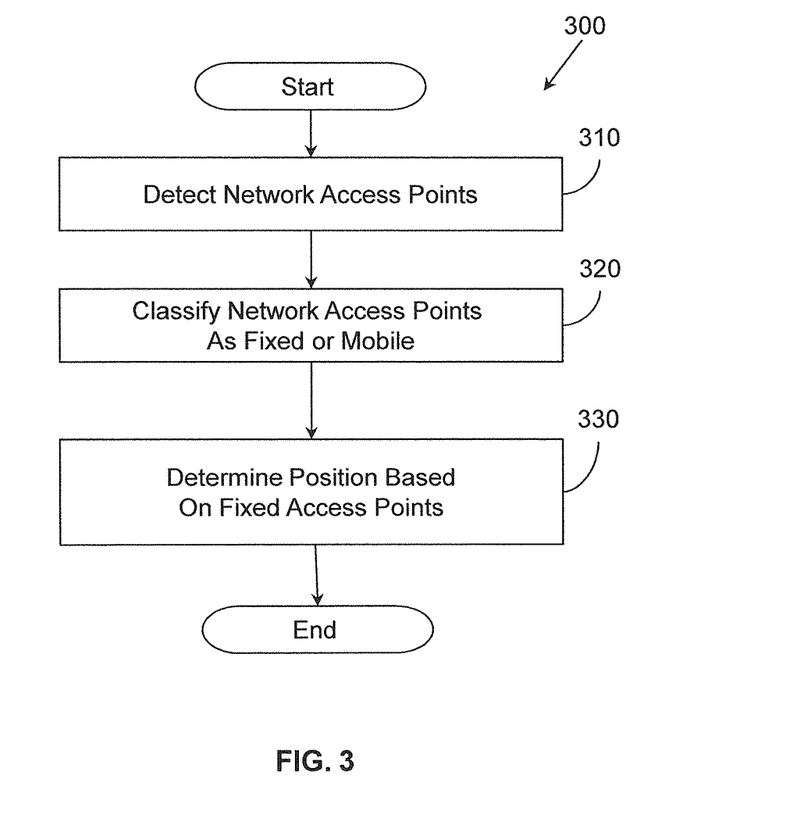
FIG. 3 illustrates one embodiment of a method for performing WiFi positioning based on a filtered set of access points.

FIG. 3 illustrates one embodiment of a method 300 that performs WiFi positioning. The method includes, at 310, detecting APs. At 320, one or more of the detected AP are classified as mobile or fixed. At 330, the method includes determining a position of a device based, at least in part, on one or more channel powers of signals received from respective one or more detected APs classified as fixed. In this manner, the position of the device is not determined based on channel powers of signals received from detected APs classified as mobile.

In one embodiment, the method 300 includes classifying a detected AP based, at least in part, on a recorded classification of fixed or mobile stored in a database and mapped to a MAC identifier for the detected AP. The method may also include storing a determined classification for the detected AP, mapped to a media access control (MAC) address for the detected AP, in the database.

In one embodiment, the method 300 includes classifying a detected AP based, at least in part, on i) a hybrid position of the apparatus determined independent of the detected AP and ii) a position of the detected AP. The hybrid position of the apparatus may be determined based, at least in part, on one or more of microelectromechanical system sensor data, global navigation satellite system (GNSS) measurement data, cellular transceiver received signal strength (RSS) data, or WiFi channel strength data for a fixed AP. A database that stores AP position data may be accessed to retrieve the position of the detected AP. A detected AP may be classified as mobile when a difference between the hybrid position of the apparatus and the position of the detected AP exceeds a predetermined threshold.

Figure 4:
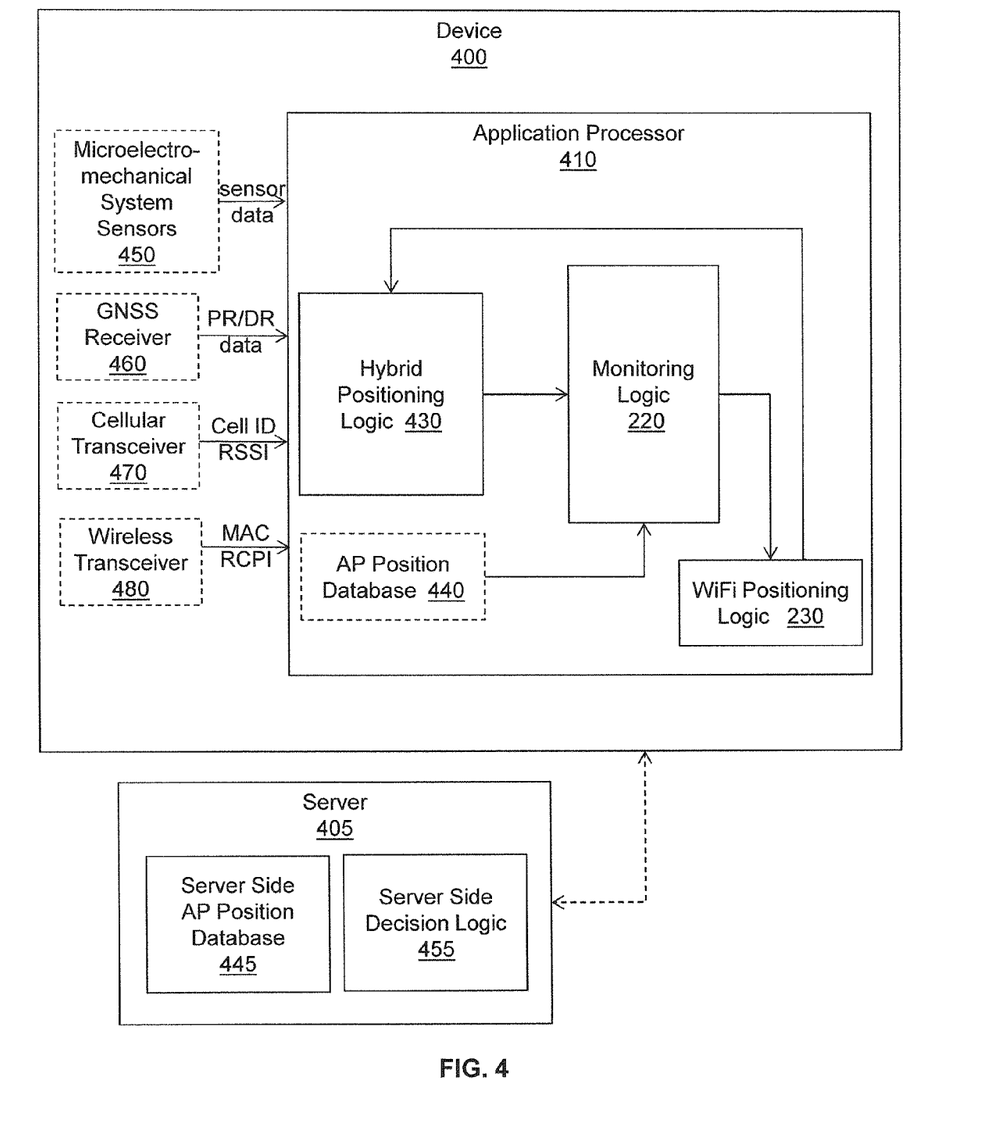
FIG. 4 illustrates one embodiment of a device that performs hybrid positioning that incorporates a WiFi position determined based on a filtered set of access points.

FIG. 4 illustrates one embodiment of a device 400 that performs WiFi positioning based on APs classified as fixed rather than mobile. The device 400 includes an application processor 410 that provides a positioning application. The device 400 is configured for wireless communication with a server 405 that supports WiFi positioning. The application processor 410 includes a hybrid positioning logic 430 that calculates a hybrid position of the device that serves as an output of the WiFi positioning application.

The application processor 410 also includes the monitoring logic 220 and the WiFi positioning logic 230 described with reference to FIG. 2. The position determined by the WiFi positioning logic 230 is one input to the hybrid positioning logic 430. The WiFi positioning logic 230 determines a position of the device based on APs that have been classified as fixed rather than mobile by the monitoring logic 220. To classify APs, the monitoring logic 220 inputs a hybrid position from the hybrid positioning logic 430 and AP position data from an AP position database 440.

In one embodiment, the AP position database 440 stored on the application processor 410 is a portion of a more comprehensive server side AP position database 445. The application processor 410 periodically synchronizes its AP position database 440 with the server side AP position database 445. In one embodiment, the application processor 410 does not include a local AP position database 440 but rather accesses the server side AP position database 445 to retrieve AP classification and/or position data.

The device 400 includes four sources of position-related data: microelectromechanical system sensors 450, a GNSS receiver 460, a cellular transceiver 470, and a wireless transceiver 480. The position-related data provided by these sources is used to calculate the hybrid position of the device. While four sources of position-related data are shown, any number and type of sources of position-related data may be employed by the device to determine the hybrid position of the device. The microelectromechanical system sensors 450 sense forces exerted on the device caused by motion. Data from the microelectromechanical system sensors 450 can be used to extrapolate a position of the device based on sensed movement of the device. The GNSS receiver 460 receives signals from GNSS satellites. A position of the device can be calculated based on the received signals as well as pseudo range (PR) and dead reckoning (DR) data determined by the GNSS receiver 460. A received signal strength indicator (RSSI) for a given cellular transmitter ID is provided by the cellular transceiver 470. The wireless transceiver 480 provides the MAC addresses for detected APs as well as an RCPI for each AP.

The APs identified by the wireless transceiver 480 are screened by the monitoring logic 220 so that only APs classified as fixed are used by the WiFi positioning logic 230. The data provided by the position-related data sources 450, 460, 470, 480 is combined by the hybrid positioning logic 430 to calculate the hybrid position of the device, which is output by the positioning application.

In some embodiments (not shown) the monitoring logic 220, the WiFi positioning logic 230 and/or the hybrid positioning logic 430 may be located in the server 405 rather than within the application processor 410. Thus the classification of APs as fixed or mobile and/or the WiFi position calculation and/or the hybrid position calculation can be performed by components within the server 405 rather than the application processor 410.

In one embodiment, a server side decision logic 455 determines a classification of APs independent of the hybrid position of the device 400. The server side decision logic 455 records the classification of each AP in the server side AP position database 445, which is synchronized with the local AP position database 440. The monitoring logic 220 retrieves the recorded classification to classify the AP for the WiFi positioning logic 230. The decision logic 455 crowd sources AP position data and uses the position data to determine if the AP is mobile using a statistical test on newly received AP position coordinates and AP position coordinates recorded in the server side AP position database 445 as shown in Equation 5.

$$\varepsilon = \frac{\sqrt{(x_{ap} - x_{apdb})^2 + (y_{ap} - y_{apdb})^2 + (z_{ap} - z_{apdb})^2}}{\sigma} \quad \text{EQ 5}$$

where the newly received position of the AP is ($x_{ap}$, $y_{ap}$, $z_{ap}$), the recorded position of the AP is ($x_{apdb}$, $y_{apdb}$, $z_{apdb}$), and $\sigma$ is the hybrid positioning error derived from the covariance matrix of a Kalman filter used in the hybrid fusion algorithm that yields the hybrid position. When E exceeds a threshold, the AP is classified as mobile and will be screened out by the monitoring logic 220.

Figure 5:
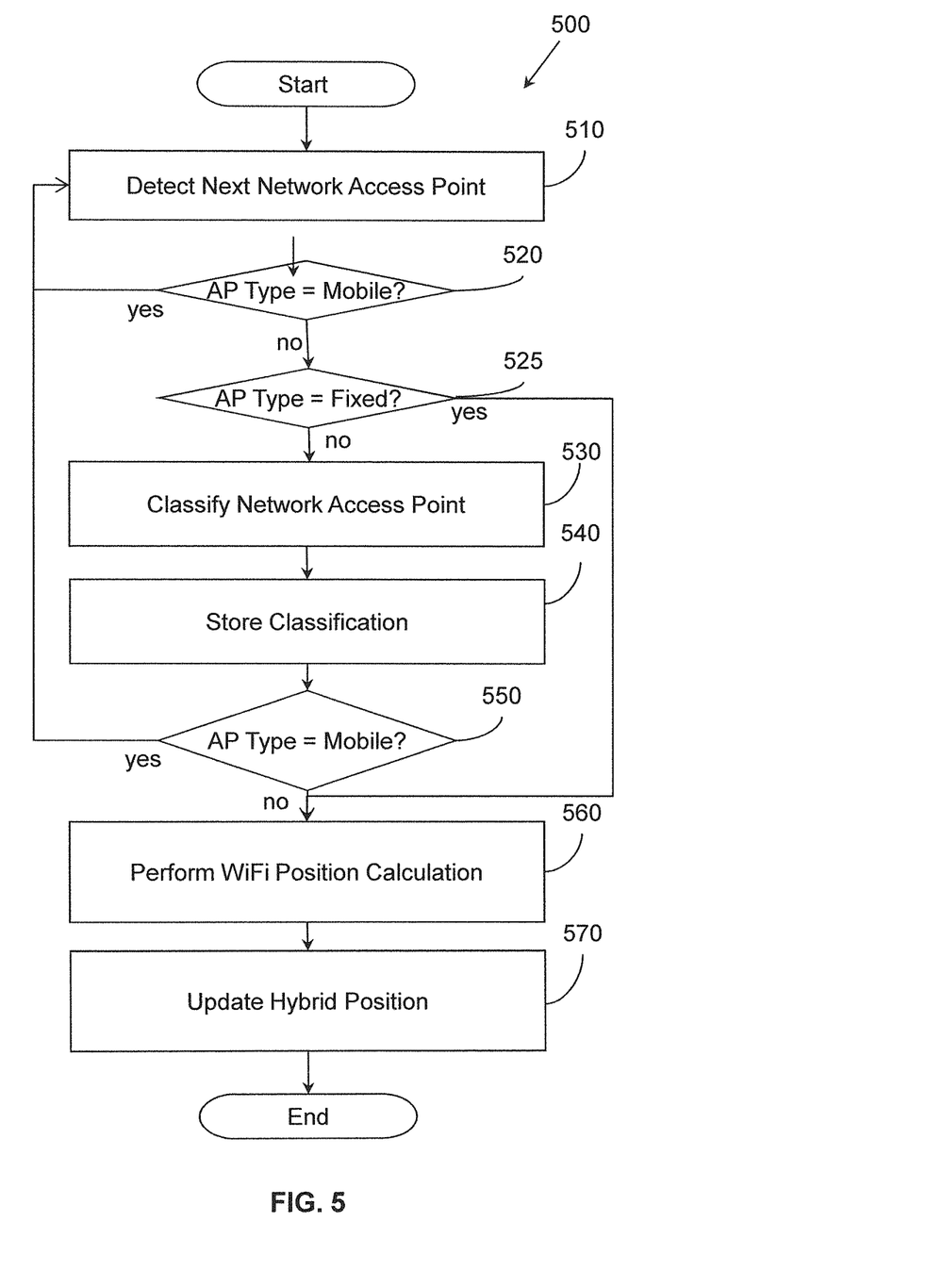
FIG. 5 illustrates one embodiment of a method for performing hybrid positioning that incorporates a WiFi position determined based on a filtered set of access points.

FIG. 5 illustrates one embodiment of a method of performing positioning for a wireless device. At 510 the method includes detecting a AP (AP). At 520, a determination is made as to whether the detected AP has already been labeled as mobile. This determination may be made by referring to a field in an AP position database that records a classification of APs as either fixed or mobile. If the AP is labeled as mobile, the AP should not be used for WiFi positioning and the method returns to 510 to detect a next AP. When the AP is not labeled as mobile, at 525 a determination is made as to whether the AP has been labeled as fixed. When the AP is labeled as fixed, at 560 a WiFi position of the device is calculated using the fixed AP. At 570 the device's hybrid position is updated with the calculated WiFi position.

When the detected AP has not been labeled as either mobile or fixed, at 530 the AP is classified as either mobile or fixed using any of the techniques discussed above. At 540, the classification is stored in the AP position database for use in future WiFi positioning. At 550 a determination is made as to whether the AP has just been classified as mobile. If the AP has been classified as mobile, the AP should not be used for WiFi positioning and the method returns to 510 to detect a next AP. When the AP is classified as fixed, at 560 a WiFi position of the device is calculated using the fixed AP. At 570 the device's hybrid position is updated with the calculated WiFi position.

In one embodiment, an initial hybrid position is calculated using a Kalman filter to combine microelectromechanical system sensor data, GNSS position data, and cellular based position data and the method 500 is used to update the hybrid position. Once a valid WiFi position can be determined at 560, the WiFi position is used to update the Kalman filter.

As can be seen from the foregoing description, WiFi positioning results can be improved by identifying and filtering out mobile APs so that WiFi positioning is performed using positions of APs that have been classified as fixed rather than mobile.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims. Thus, this disclosure is intended to embrace alterations, modifications, and variations that fall within the scope of the appended claims, which satisfy the statutory subject matter requirements of 35 U.S.C. §101.

What is claimed is:

1. A device, comprising:
   positioning logic configured to receive respective positions of a plurality of access points; and
   monitoring logic configured to classify a respective one of the plurality of access points as being mobile or fixed according to i) a hybrid position of the device determined independent of the respective one of the plurality of access points and ii) a recorded position of the respective one of the plurality of the access points,
   wherein the monitoring logic is configured to classify an access point as being mobile when a difference between the hybrid position of the device and the recorded position of the access point exceeds a threshold, wherein the monitoring logic is configured to determine the threshold according to a statistical distribution of a positioning error, and wherein an access point is classified as being fixed when the access point is located at a fixed position;
   wherein the positioning logic is further configured to determine a position of the device according to:
   i) channel powers of signals received from access points of the plurality of access points classified as being fixed and
   ii) fixed positions of the access points classified as being fixed, and
   wherein the positioning logic is configured to ignore positions of access points of the plurality of access points classified as being mobile when determining the position of the device.

2. The device of claim 1, wherein the monitoring logic is configured to, for each access point of the plurality of access points:
   access a database that stores classifications for access points that indicate whether each of the plurality of access points is fixed or mobile;
   identify, in the database, a stored classification that is mapped to a MAC identifier for each of the plurality of access points; and
   classify each of the plurality of the access points based, at least in part, on the stored classification.

3. The device of claim 2, wherein the monitoring logic is configured to:
   classify one of the plurality of access points as being either fixed or mobile; and
   store the determined classification, mapped to a media access control (MAC) address for the one of the plurality of access points, in the database.

4. The device of claim 2, comprising a server side decision logic implemented in a server, wherein the server side decision logic is configured to:
   classify an access point as being either fixed or mobile based, at least in part, on a present position of the access point and a recorded position of the access point stored in a position database; and
   store the classification, mapped to a media access control (MAC) address for the access point, in the database.

5. The device of claim 1, wherein the hybrid position of the device is determined based, at least in part, on one or more of microelectromechanical system sensor data, global navigation satellite system (GNSS) measurement data, cellular transceiver received signal strength (RSS) data, or WiFi channel strength data for a fixed access point.

6. The device of claim 1, wherein the monitoring logic is configured to:
   access a database that stores access point position data; and
   retrieve the recorded position of the respective one of the plurality of access points that is being classified as being fixed or mobile.

7. A method, comprising:
   detecting, in a device, a plurality of access points;
   classifying one or more access points of the plurality of access points as being either fixed or mobile according to i) a hybrid position of the device determined independent of the one or more access points of the plurality of access points and ii) a recorded position of the one or more access points, wherein an access point is classified as being mobile when a difference between the hybrid position of the device and the recorded position of the access point exceeds a threshold,
   wherein classifying the one or more access points includes determining the threshold according to a statistical distribution of a positioning error, and wherein the access point is classified as mobile to indicate that the access point changes positions, and wherein the access point is classified as being fixed to indicate that the access point is located at a fixed position; and
   determining a position of the device according to channel powers of signals received from one or more of the plurality of access points classified as being fixed; and
   wherein determining the position of the device includes ignoring positions of access points of the plurality of access points classified as being mobile.

8. The method of claim 7, further comprising classifying an access point of the plurality of access points by:
   accessing a database that stores classifications for the plurality of access points;
   identifying, in the database, a stored classification that is mapped to a MAC identifier for the access point; and
   classifying the access point based, at least in part, on the stored classification.

9. The method of claim 8, further comprising:
   classifying an access point of the plurality of access points as being either fixed or mobile; and
   storing the determined classification, mapped to a media access control (MAC) address for the access point, in the database.

10. The method of claim 7, wherein the hybrid position of the device is determined based, at least in part, on one or more of microelectromechanical system sensor data, global navigation satellite system (GNSS) measurement data, cellular transceiver received signal strength (RSS) data, or WiFi channel strength data for a fixed access point.

11. The method of claim 7, further comprising accessing a position database that stores access point position data and retrieving the recorded position.

12. A device comprising:
    a wireless transceiver; and
    an application processor comprising:
    positioning logic configured to receive respective positions of a plurality of access points; and
    monitoring logic configured to classify a respective one of the plurality of access points as being mobile or fixed according to i) a hybrid position of the device determined independent of the respective one of the plurality of access points and ii) a recorded position of the respective one of the plurality of the access points,
    wherein the monitoring logic is configured to classify an access point as being mobile when a difference between the hybrid position of the device and the recorded position of the access point exceeds a threshold, wherein the monitoring logic is configured to determine the threshold according to a statistical distribution of a positioning error, and wherein the monitoring logic classifies the access point as mobile when the access point changes positions, and wherein the monitoring logic classifies the access point as being fixed when the access point is located at a fixed position and does not change positions;

wherein the positioning logic is further configured to determine a position of the device according to:

i) channel powers of signals received from access points of the plurality of access points classified as being fixed and ii) fixed positions of the access points classified as being fixed, and wherein the positioning logic is configured to ignore positions of access points of the plurality of access points classified as being mobile when determining the position of the device.

13. The device of claim 12, further comprising
at least one source of position-related data; and
a hybrid position logic configured to derive a hybrid position of the device based, at least in part, on the position-related data.

14. The device of claim 13, wherein the at least one source of position-related data comprises one or more of a microelectromechanical sensor, a global navigation satellite system (GNSS) receiver, a cellular transceiver, or a wireless transceiver.

15. The device of claim 12, wherein:
the device is configured to communicate with a server associated with a network to which the device belongs;
a position database is stored in memory associated with the application processor; and
the application processor is configured to synchronize the position database with a database maintained by the server that stores access point position data.

* * * * *